United States Patent Office 2,952,123
Patented Sept. 13, 1960

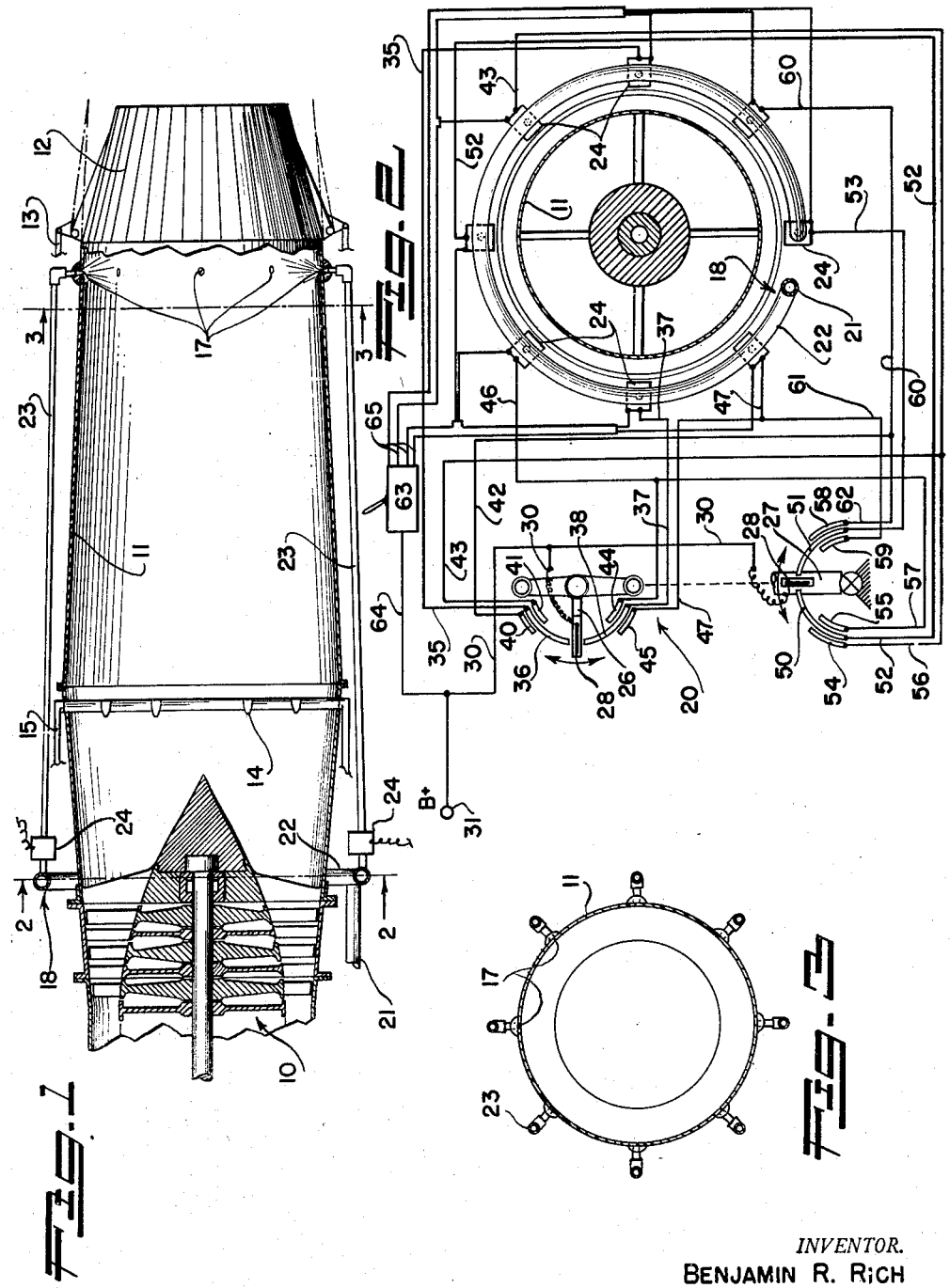

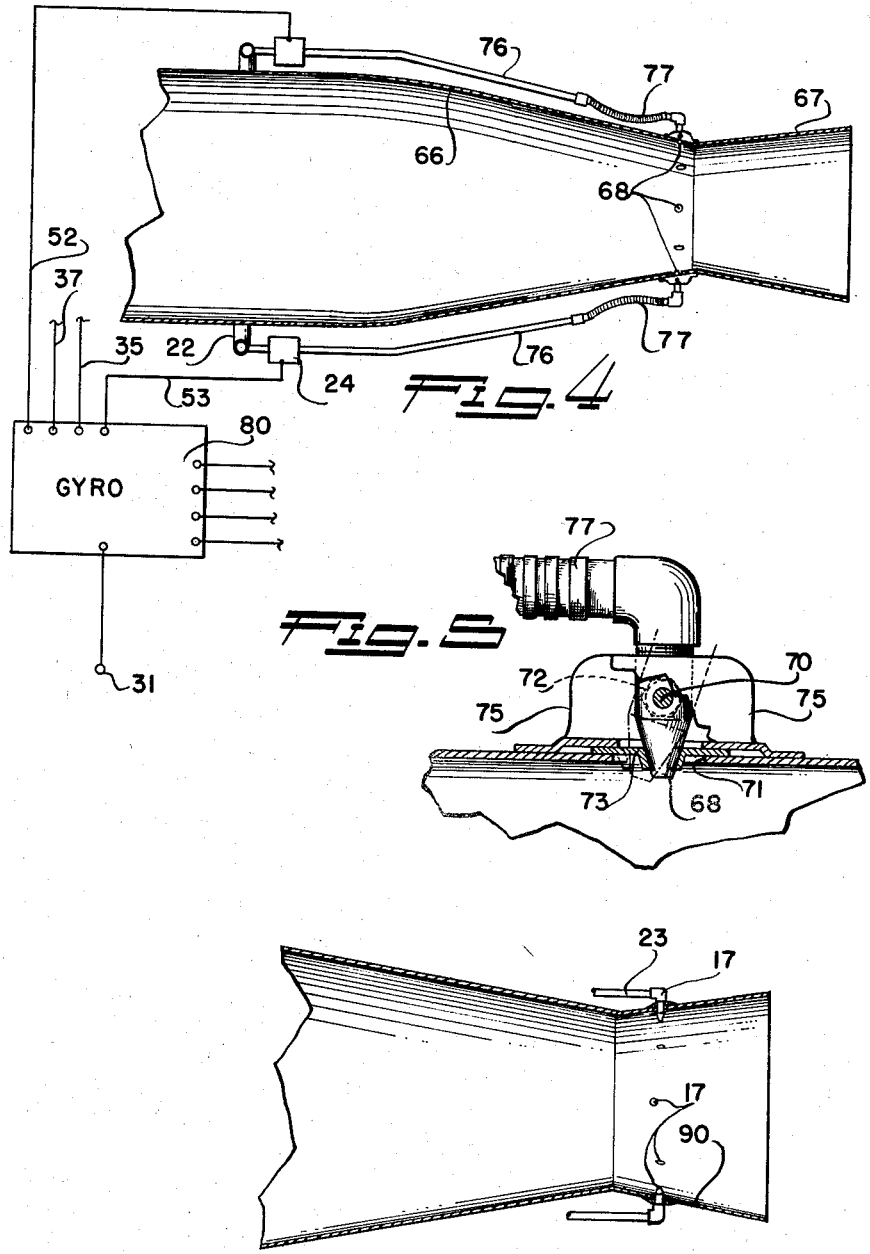

2,952,123
DIRECTIONAL CONTROLS FOR PROPULSIVE JETS

Benjamin R. Rich, Van Nuys, Calif., assignor to Lockheed Aircraft Corporation, Burbank, Calif.

Filed May 25, 1956, Ser. No. 587,236

13 Claims. (Cl. 60—35.54)

This invention relates to jet propulsion and relates more particularly to propulsive jet thrust directional controls and augmentation devices useful with turbo jet, ram jet and other jet producing engines.

At the present time directional control devices in the form of vanes and like mechanical means are sometimes used in the nozzle wake of jet propulsion aircraft engines to deflect the jet flow for directional control and for jet impingement avoidance purposes. In certain cases the lift of such vanes is also utilized to provide pitch or roll control. Such mechanical devices of necessity introduce substantial loss or drag and since they involve mechanical parts projecting into or through the high temperature high velocity jet stream they are necessarily expensive and complicated. It has been proposed to direct high energy air streams into the main propulsive jet stream to deflect the same for control or impingement avoidance purposes. This latter type system is limited for use with supersonic propulsive nozzles since it utilizes an oblique shock wave to deflect the primary propulsive jet stream.

It is a general object of the present invention to provide a simple, effective directional control system for the propulsive jet of aircraft and rocket engines that does not have the limitations and disadvantages of the prior jet directional controls. The device or system of the invention does not incorporate or require the employment of drag producing mechanical parts projecting into the primary jet stream where they are subjected to the action of the high temperature high velocity stream. Furthermore, the device or system of the invention may be employed with either sub-sonic or supersonic nozzles of either the fixed or variable area types.

Another and important object of the invention is to provide a propulsive jet deflecting or directional control system of this character that actually augments the effective thrust of the propulsive jet stream. In accordance with this invention the primary propulsive jet stream is diverted or deflected by the energy of a secondary fuel injected into the primary jet stream from one or more fuel nozzles to be augmented by the burning of the secondary fuel. The secondary fuel which is preferably of a high energy type such as a pyrogoric type or extremely fast burning fuel adds considerable additional energy to the primary propulsive jet stream. This a distinct advantage over the prior jet deflecting or jet directing systems which actually reduce the effective thrust of the primary jet stream.

Another object of the invention is to provide a propulsive jet stream control of this character that may be utilized when desired as a "pure" thrust augmenter or afterburner. The device or system includes a plurality of fuel nozzles spaced circumferentially around the wall of the primary propulsive nozzle and arranged to inject the secondary fuel radially or angularly into the primary jet stream and these several secondary nozzles may be simultaneously supplied with fuel under pressure which burns with the primary jet stream to materially increase the thrust output of the engine.

Another object of the invention is to provide a system of this kind incorporating a control means under the control of a pilot or autopilot for selectively supplying the secondary fuel to one or more of the aforementioned secondary fuel injecting nozzles for the purpose of producing propulsive jet stream deflection for directional control of the aircraft. The secondary fuel injecting nozzles may be arranged in sets or groups located and related so that, for example, one nozzle of a set may be supplied with secondary fuel to provide a nose-down pitching effect and if this action requires augmentation other adjacent nozzles of the same set may also be supplied with secondary fuel to increase the deflection of the primary jet stream which produces the desired nose-down action. The secondary fuel injecting nozzles are arranged in a manner and are controlled to provide for a lateral directional control as well as pitching control.

It is a further object of the invention to provide a device or system of this character wherein the secondary fuel injecting nozzles are movable and are adapted to be adjusted or controlled to direct or inject the secondary fuel into the primary jet stream at selected or optimum angles.

Other objectives and features of the invention will become apparent from the following detailed description of typical preferred forms and applications of the invention throughout which description reference will be made to the accompanying drawings wherein:

Figure 1 is a fragmentary longitudinal sectional view of a turbo jet engine provided with a control system of the invention with the primary propulsive nozzle appearing in side elevation;

Figure 2 is a transverse detailed sectional view taken substantially as indicated by line 2—2 on Figure 1 and illustrating diagrammatically the circuits and controls for the secondary fuel injecting nozzles;

Figure 3 is a transverse sectional view taken as indicated by line 3—3 on Figure 1;

Figure 4 is a fragmentary longitudinal sectional view of the aft portion of a propulsive jet engine or the like, illustrating a system of the invention thereon incorporating adjustable secondary fuel nozzles and diagrammatically illustrating a gyro control for the same;

Figure 5 is an enlarged fragmentary sectional view of one of the adjustable secondary fuel injecting nozzles of Figure 4; and Figure 6 is a fragmentary longitudinal sectional view of a supersonic primary propulsive nozzle with the secondary fuel injecting nozzles of the invention associated therewith.

In Figures 1, 2 and 3, I have shown an embodiment of the invention employed with a jet propulsion engine of the turbo jet type. The portion of the engine illustrated includes a turbine 10 driven by the compressed air and combustion gases from the compressor and combustor means (not shown). A tailpipe or jet stack 11 extends aft from the turbine 10 to conduct the stream of high temperature high pressure gases to the propulsive nozzle 12. The nozzle 12 as illustrated is of the variable area type as indicated by the full line and broken line positions of Figure 1 and is actuated or controlled by control rods 13 or the equivalent. The nozzle 12 may either be of the convergent or convergent-divergent class and the latter can be either a mechanical or aerodynamic type. The particular engine illustrated is provided with an afterburner 14 arranged in the stack or tailpipe section 11 downstream from the compressor 10 and supplied with fuel under pressure by one or more fuel lines 15 to inject fuel in the propulsive stream when augmented thrust is required. It is to be understood the invention is not limited for use with a propulsive jet engine of the particular type or class illustrated since it is useful with ram jet engines and various other jet devices.

The form of the invention illustrated in Figures 1, 2 and 3 may be said to comprise generally a plurality of directional control and thrust augmenting fuel injecting nozzles 17 in the jet stack 11 or the nozzle 12, fuel supply means 18 for the nozzles 17, and a control system 20 for selectively or simultaneously directing fuel to the nozzles 17.

The nozzles 17 are provided to inject fuel preferably high energy, fast burning fuel such as a slurry of finely divided metal in a fluid carrier, high energy gases and liquids such as hydrazine, liquid oxygen, nitric acid, etc. into the jet pipe 11 immediately ahead of or into the propulsive nozzle 12. Where a variable area propulsive nozzle is employed on the engine it will usually be preferred to arrange the supplemental fuel nozzles 17 immediately ahead of or upstream from the propulsive nozzle. Thus, as shown in Figure 1 the directional control and thrust augmenting nozzles 17 are located at the aft end of the rearwardly converging jet stack 11 adjacent the propulsive nozzle 12. The secondary fuel nozzles 17 are arranged to be substantially flush with the wall of the pipe 11 and are directed laterally inward with respect to the primary propulsive jet stream, that is, they are directed substantially radially inward. However, as will be later described the fuel injectors or nozzles 17 may be shiftable or adjustable to direct their streams inwardly at various angles if this is desired or necessary. While the invention contemplates the employment of a single fuel nozzle 17 in certain applications of the invention for example, where it is desired to avoid impingement of the primary propulsive jet stream with adjacent structure, it will usually be desirable to employ a plurality of circumferentially spaced fuel nozzles. Thus, in a typical case there may be four equally spaced fuel nozzles 17, two at diametrically opposite points namely at the top and bottom regions of the pipe 11 and two diametrically opposite nozzles 17, one at the right side and one at the left side of the pipe 11 so that by selectively supplying supplemental fuel to the nozzles the primary propulsive jet may be deflected to obtain upward or downward pitching control and right and left lateral control. In the particular case illustrated there are equally spaced fuel nozzles 17, two arranged on the central horizontal axis with one at each side of the pipe and intermediate nozzles 17 located 45 degrees between these four nozzles. It is to be understood the invention is not to be construed as limited or restricted to this particular arrangement of the supplemental of the fuel injecting nozzles 17 since the location of the nozzles may well depend upon the particular engine installation and like factors.

The fuel supply or distributing means 18 includes a fuel supply pipe 21 obtaining the high energy fuel under pressure from a source not shown and leading to a circular manifold 22. The manifold pipe 22 may surround the engine or the jet pipe 11 and individual lines 23 extend from the manifold pipe to the respective fuel injecting nozzles 17. A fuel flow regulator 24 is interposed in each nozzle line 23. The regulators 24 are in the nature of remotely or electrically controlled valves and in practice may be solenoid operated valves that are closed when de-energized and that are opened upon energization.

The control system 20 is operable to actuate or energize the fuel flow valves 24 either selectively to cause deflection of the primary propulsive jet stream by the action of fuel injected therein from selected nozzles 17 or simultaneously to cause all of the nozzles 17 to inject supplemental fuel into the jet stream to substantially augment the propulsive thrust of the engine. The system 20 may be manually actuated by operation of control column elements and/or pedals, or the like, in the cockpit or may be actuated by an automatic pilot, or the like, or by both. In the drawings I have shown in Figure 2 a control system 20 operated by two manually movable levers 26 and 27. Each lever 26 and 27 carries a contact bar electrically connected by leads 30 with an electrical power source 31. In this connection it will be assumed that the regulators or valves 20 each have one post or side grounded to the aircraft structure. An energizing lead 35 extends from the valve 24 controlling the right-hand nozzle line 23 and nozzle 17, as viewed in Figure 2, and this lead 35 extends to an arcuate stationary contact 36 adjacent the lever 26. A similar lead 37 extends from the valve 24 controlling the left-hand fuel nozzle 17 and is connected with a similar stationary arcuate contact 38 adjacent the lever 26. The contacts 36 and 38 are in circumferential alignment with one another and are spaced apart. With the lever 26 in an idle or neutral position the contact 28 is spaced between the stationary contacts 36 and 38. Upon manual movement of the lever 26 in one direction, for example, in a clockwise direction the contact 28 is moved into engagement with the stationary contact 36 to energize the regulator or valve 24 controlling the right-hand fuel injecting nozzle 17 to provide for the injection of fuel from this nozzle into the primary propulsive jet stream. In a like manner when the lever 26 is manually moved in a counterclockwise direction the contact 28 is brought into engagement with the stationary contact 38 to cause opening of the regulator 24 controlling the left-hand nozzle 17 and supplemental fuel is injected therefrom into the primary jet stream. The contacts 36 and 38 are of substantial length so that the manual lever 26 may be moved to advance its contact 28 therealong for a considerable distance. Spaced stationary contacts 40 and 41 are provided adjacent the remote end of the contact 36 to be engaged by the contact 28 when the lever 26 is moved a substantial distance in a clockwise direction. A lead 42 extends from the contact 40 to the valve 24 controlling the fuel injecting nozzle 17 spaced below the right-hand nozzle 17. A similar lead 43 extends from the contact 41 to the valve 24 controlling the fuel nozzle 17 spaced above the right-hand nozzle 17. Thus, when the pilot wishes to obtain full supplemental fuel injection into the right side of the primary jet stream to produce a lateral control to the left he moves the lever 26 to bring the contact 28 into engagement with the contacts 40 and 41 so that supplemental fuel is injected from the three nozzles 17 at the right side of the pipe 11 or propulsive nozzle 12. Contacts 44 and 45 are spaced at opposite sides of the arcuate contact 38 adjacent its remote end to be engaged by the elongate contact 28 when the lever 26 is moved a substantial distance in the counter-clockwise direction. Leads 46 and 47 from the contacts 44 and 45 respectively to the valves 24 controlling the fuel injecting nozzles 17 spaced above and below the left central nozzle 17. When the pilot wishes to produce full supplemental fuel injection into the left side of the primary jet stream to obtain lateral control to the right he moves the lever 26 in a direction to bring the contact 28 into engagement with the contacts 46 and 47 so that supplemental fuel is simultaneously injected from the three nozzles 17 at the left side of the jet tailpipe 11 or propulsive nozzle 12.

The control 20 further includes aligned arcuate contacts 50 and 51 curved about the axis of rotation of the manual lever 27. The contacts 50 and 51 are spaced apart and when the lever 27 is in an idle or neutral position its contact 28 is spaced between and clear of both contacts 50 and 51. A lead 52 extends from contact 50 to the valve 24 controlling the uppermost fuel injecting nozzle 17. A similar lead 53 extends from the contact 51 to the valve 24 controlling the lowermost fuel injecting nozzle 17. Manual movement of the lever 27 in a clockwise direction brings the contact 28 into engagement with contact 51 to complete an energizing circuit from the power source 31 to the valve 24 controlling the lowermost fuel injecting nozzle 17 to effect opening of the valve 24 so that fuel is injected into the lower portion of the primary propulsive stream to obtain an upward pitching control of the aircraft. Conversely, when the lever 27 is moved to the left or in a counter-clockwise direction contact 28 engages contact 50 to complete an energizing circuit to the valve 24 controlling the delivery of supplemental fuel under pressure to the uppermost nozzle 17 so that a downward pitching effect is obtained. Spaced contacts 54 and 55 are provided adjacent the remote end of contact 50 and leads 56 and 57, extend therefrom to the valves 24 for the nozzles 17 spaced at each side of the uppermost fuel nozzle 17. When it is desired to inject additional supplemental fuel in the upper portion of the primary jet stream the pilot moves the lever 27 to bring its contact 28 into engagement with the contacts 54 and 55 so as to energize the valves 24 which admit supplemental fuel to the nozzles 17 at the opposite sides of the uppermost injecting nozzle 17. Spaced stationary contacts 58 and 59 are arranged adjacent the remote end of contact 51 and leads 60 and 61 extend therefrom to the valves 24 controlling the fuel injecting nozzles 17 spaced at the opposite sides of the lowermost nozzle 17. When the pilot moves the lever 27 in a clockwise direction he first brings contact 28 into engagement with contact 51 to energize the valve 24 to supply fuel under pressure to the lowermost injecting nozzle 17 and as he continues movement of the lever the contact 28 engages contacts 58 and 59 to open the valves 24 supplying fuel under pressure to the nozzles 17 at the opposite sides of the lowermost nozzle 17.

From the foregoing it will be seen how supplemental fuel may be injected under pressure from the individual nozzles 17 or from given groups of nozzles 17 to deflect the primary propulsive jet stream for directional control of the aircraft. The control system 20 further includes means whereby all of the valves 24 may be energized or opened to provide for the simultaneous discharge of fuel under pressure from the several nozzles 17 and thus produce a substantial augmentation of the jet thrust. This means includes a switch 63 interposed between a powerline 64 leading to the source 31 and leads 65 extending to the several electrically operated valves 24. The switch 63 is manually operable to electrically connect the leads 65 with power to cause fuel to be injected from all of the fuel nozzles 17 for jet thrust augmentation. The switch 63 is normally open so that levers 26 and 27 may be operated as required for directional control.

Figures 4 and 5 of the drawings illustrate another form and application of the invention. In this case the system of the invention is used in connection with a jet engine tailpipe or stack 66 which converges to a waist or throat and then flares rearwardly in the form of a divergent nozzle 67. It is to be understood the invention is not to be construed as limited for use with this particular type of convergent-divergent nozzle since it is apparent the nozzle may be of the type employing a central plug or needle, or aerodynamic or ejector means to obtain the convergent-divergent effect. The engine may be of the rocket, ram jet or turbo jet type and may or may not have an afterburner. Supplemental fuel injection nozzles 68 are arranged to inject high energy, rapid burning fuel into the pipe or the nozzle 67. I have shown the fuel injecting nozzles 68 arranged adjacent the throat of the tailpipe and they are circumferentially spaced in the same manner as the nozzles 17 above described. Pivots 70 support the nozzles 68 between spaced lugs 75 on the exterior of the pipe 66 and the inner ends of the nozzles project into or through slots 71 in the wall of the pipe. Nuts 72 or the equivalent on the pivots 70 may be used to secure or lock the nozzles 68 after their individual adjustment or movement on their pivots 70. Plates 73 are associated with the nozzles 68 to move therewith at the under sides of the lugs 75. The plates 73 serve to close or seal off the slots 71 around the nozzles 68 in all positions of the nozzles. It will be seen how the nozzles 68 may be moved to direct their streams of fuel radially inward, radially inward and aft or radially inward and forward as desired.

Fuel is supplied under pressure from the manifold ring 22 to the nozzles 68 by pipes 76. The pipes 76 have flexible portions 77 adjacent the nozzles 68 to allow free pivotal adjustment or movement of the nozzles. The fuel flow regulators or control valves 24 are interposed in the fuel supply pipes 76 of the nozzles 68 and may be operated or controlled by the control means 20 described in detail above. In Figure 4, I have shown a gyro mechanism or autopilot 80 arranged to control or energize the leads 35, 37, 52, 53, etc. of the several supplemental fuel valves 24.

Figure 6 illustrates the supplemental fuel injecting nozzles 17 located to inject fuel into the aft portion of a convergent-divergent propulsive nozzle 90 of a jet propulsion device such as a ram jet engine, turbo jet engine, rocket engine, or the like. The nozzles 17 are shown spaced between the throat and the rear extremity of the propulsive nozzle 90. While the nozzles 17 are shown fixed as in Figure 1 it is to be understood they may be pivoted or movable as the nozzles 68 shown in Figure 5.

It is believed that the operation of the systems or controls of the invention will be readily understood from the foregoing detailed description. Upon opening a valve 24 the fast burning high energy fuel is injected from the related nozzle 17 or 68 into the primary jet stream. The supplemental fuel is injected in a direction in which the primary jet stream is to be deflected. Thus, if it is desired to deflect the jet stream upwardly and aft the supplemental fuel is discharged from the lower fuel injecting nozzle or nozzles 17 or 68 so that the energy of the supplemental fuel serves to deflect the primary jet stream upwardly and aft. It is important to observe that the energy of the supplemental fuel thus introduced into the primary jet stream not only serves to deflect the flow of the primary stream but adds appreciable energy to the thrust producing stream. The levers 26 and 27 may be operated simultaneously for "differential" directional control and to have their contacts 28 each engage one or three of the related contacts 36, 40 and 41, 38, 44 and 45, 51, 58 and 59 etc. As already described, when it is desired to obtain a "pure" additional thrust the valves 24 may be simultaneously energized to provide for the injection of fuel from all of the nozzles 17 or 68 so as to materially add energy to the propulsive stream without appreciably deflecting the same.

Having described only typical forms of the invention I do not wish to be limited to the specific details herein set forth, but wish to reserve to myself any variations or modifications that may appear to those skilled in the art and fall within the scope of the following claims.

I claim:

1. In combination with an engine producing a propulsive jet stream; a pipe for conducting said stream from the engine, a propulsive nozzle on the pipe for discharging said stream in the form of a propulsive jet, means for deflecting said jet including fuel nozzles for injecting fuel into said stream at a plurality of points spaced circumferentially and concentric thereof in the region of the propulsive nozzle, and means for selectively supplying fuel to the fuel nozzles for discharge therefrom and burning at selected points spaced circumferentially of said stream.

2. In combination with an engine having a duct conducting propulsive jet stream and a propulsive nozzle discharging the stream from the duct in the form of a propulsive jet; fuel injectors for discharging fuel into said stream at an angle to the direction of flow thereof and in the region of said nozzle, the injectors being spaced circumferentially and concentric with respect to said stream and being individually adjustably positionable along the longitudinal axis of the engine for presenting the injector discharge at a predetermined angle to this axis, a system for supplying fuel to the injectors, and a control for said system operable to provide for the passage of fuel to selected injectors whereby the fuel discharged therefrom burns in said stream to deflect said propulsive jet and adds energy thereto.

3. In combination with an engine having a duct conducting a propulsive jet stream and a propulsive nozzle discharging the stream from the duct in the form of a propulsive jet; fuel injectors for discharging fuel into said stream at an angle to the direction of flow thereof and in the region of said nozzle, the injectors being spaced circumferentially and concentric with respect to said stream and being individually adjustably positionable along the longitudinal axis of the engine for presenting the injector discharge at a predetermined angle to this axis, a system for supplying fuel to the injectors including a valve for controlling each injector, and electrical means for selectively opening the valves to cause the discharge of fuel from selected injectors so that the fuel introduced into said stream burns therein to deflect said propulsive jet and to add energy thereto.

4. In combination with an engine having a duct conducting a propulsive jet stream and a propulsive nozzle discharging the stream from the duct in the form of a propulsive jet; fuel injectors for discharging fuel into said stream at an angle to the direction of flow thereof and in the region of said nozzle and being individually adjustably positionable along the longitudinal axis of the engine for presenting the injector discharge at a predetermined angle to this axis, the injectors being spaced circumferentially and concentric with respect to said stream, a system for supplying fuel to the injectors, valves for the several injectors, and a remotely controlled electrical system operable to selectively open and close the valves to cause deflection of the jet and to simultaneously open the valves to add energy to the jet.

5. In combination with an engine having a duct conducting a propulsive jet stream and a propulsive nozzle discharging the stream from the duct in the form of a propulsive jet; a first fuel nozzle for discharging fuel into the right side of said stream in the region of the propulsive nozzle, a second fuel nozzle for discharging fuel into the left side of said stream in the region of the propulsive nozzle, the first and second fuel nozzles being individually adjustable along the longitudinal of the engine to present the nozzle fuel discharge at a predetermined angle to this axis, and electrical means selectively operable to supply fuel to either said first or second nozzle for discharge therefrom to burn in said stream to deflect said jet to the left or to the right.

6. In combination with an engine having a duct conducting a propulsive jet stream and a propulsive nozzle discharging the stream from the duct in the form of a propulsive jet; fuel nozzles arranged to discharge fuel into said propulsive nozzle adjacent the rear end thereof and at points spaced circumferentially and concentric of the propulsive nozzle, and means electrically operable to supply fuel to selected fuel nozzles for discharge therefrom into said stream so as to burn therein and deflect said jet and add energy thereto.

7. In combination with an engine having a duct conducting a propulsive jet stream and a propulsive nozzle discharging the stream from the duct in the form of a propulsive jet; fuel nozzles individually adjustably arranged to discharge fuel into the duct at the upstream end of the propulsive nozzle at points spaced circumferentially and concentric of the duct and at a predetermined angle to longitudinal axis of the engine, and means electrically operable to supply fuel to selected fuel nozzles for discharge therefrom into said stream so as to burn therein and thus deflect said jet.

8. Propulsive jet means for discharging the propulsive stream of an engine comprising a convergent-divergent nozzle structure having a throat, fuel nozzles spaced circumferentially of the throat to discharge fuel therein, and means operable to supply fuel to selected fuel nozzles for discharge therefrom to burn in said stream and thus deflect the same.

9. Propulsive jet means for discharging the propulsive stream of an engine comprising a pipe for said stream, a divergent nozzle on the pipe discharging said stream as a propulsive jet, fuel injecting nozzles spaced circumferentially of the divergent nozzle to discharge therein, and means for supplying fuel to selected fuel nozzles for burning within the stream to effect deflection of said jet.

10. Propulsive jet means for discharging the propulsive stream of an engine comprising a pipe for said stream, a variable area nozzle on the pipe for discharging said stream as a propulsive jet, circumferentially spaced and individually adjustable fuel injecting nozzles at the upstream region of the variable area nozzle and concentric therewith, and a system for supplying fuel to said fuel nozzles so as to increase the thrust energy of said jet and electrically operable to selectively supply fuel to given fuel nozzles to cause deflection of said jet.

11. In combination with an engine producing a primary propulsive jet stream; a pipe for conducting said stream from the engine, a propulsive nozzle on the pipe for discharging said stream in the form of a propulsive jet, means for deflecting said jet including at least one fuel injecting nozzle discharging fuel into said stream for burning therein in the region of said propulsive nozzle and in a plane which is substantially radial with respect to said stream, and means supporting the fuel injecting nozzle for angular movement in said plane.

12. In combination with an engine having a duct conducting a primary propulsive jet stream and a propulsive nozzle discharging the stream from the duct in the form of a propulsive jet; means for adding propulsive energy to the jet including individually adjustable fuel nozzles arranged to discharge fuel into said stream in the region of the propulsive nozzle at a predetermined angle to the longitudinal axis of the engine, the fuel nozzles being spaced circumferentially of and concentric to said stream, and a fuel supply system supplying fuel to the fuel nozzles including electric controls.

13. In combination with an engine having a duct conducting a propulsive jet stream and a propulsive nozzle discharging the stream from the duct in the form of a propulsive jet; means for adding propulsive energy to the jet including fuel nozzles arranged to discharge fuel into said stream in the region of the propulsive nozzle, the fuel nozzles being spaced circumferentially of and concentric to said stream and being individually adjustable in parallel to the longitudinal axis of the engine, a fuel supply system supplying fuel to the fuel nozzles, the supply system including fuel lines carrying fuel to the fuel nozzles, a valve for each of said lines, and electric control means operable to simultaneously open said valves and to simultaneously close said valves and to open one or more selected valves to supply fuel to given fuel nozzles in order to cause deflection of said jet.

References Cited in the file of this patent

UNITED STATES PATENTS

| 1,762,678 | Bryan | June 10, 1930 |
|---|---|---|
| 2,058,530 | Thomas | Oct. 27, 1936 |
| 2,216,518 | Parsons | Oct. 1, 1940 |
| 2,336,269 | Luellen | Dec. 7, 1943 |
| 2,496,520 | Daniel | Feb. 7, 1950 |
| 2,508,420 | Redding | May 23, 1950 |
| 2,518,000 | Goddard | Aug. 8, 1950 |
| 2,536,440 | Greenland | Jan. 2, 1951 |
| 2,568,921 | Kroon | Sept. 25, 1951 |
| 2,653,445 | Halford et al. | Sept. 29, 1953 |
| 2,865,170 | Kadosch | Dec. 23, 1958 |

FOREIGN PATENTS

| 503,064 | Belgium | May 31, 1951 |
|---|---|---|
| 1,057,271 | France | Oct. 28, 1953 |
| 1,064,301 | France | Dec. 23, 1953 |

OTHER REFERENCES

Chandler: "Aero Digest Magazine," vol. 60, No. 4, April 1950, pages 100–102.